United States Patent [19]

Coleman

[11] Patent Number: 5,052,641

[45] Date of Patent: Oct. 1, 1991

[54] METHOD TO CONSTRUCT VARIABLE AREA, MEMBRANE SPAR AND WING AIRFOIL AIRCRAFT AND KITE WINGS AND SUITABLE AELERONS

[76] Inventor: Henry L. Coleman, 1749 Wesley Ave., El Cerrito, Calif. 94530

[21] Appl. No.: 581,073

[22] Filed: Sep. 7, 1990

Related U.S. Application Data

[63] Continuation-in-part of Ser. No. 334,683, Apr. 6, 1989, abandoned.

[51] Int. Cl.$^5$ .................... B64C 3/54; B64C 31/06
[52] U.S. Cl. ................... 244/218; 244/123; 244/153 R
[58] Field of Search ............... 244/218, 219, 123, 93, 244/153 R, 49

[56] References Cited

U.S. PATENT DOCUMENTS

| 1,291,260 | 1/1919 | Thompson | 244/218 |
|---|---|---|---|
| 1,853,233 | 4/1932 | Schwarz | 244/93 |
| 2,137,047 | 11/1938 | Gliwa | 244/218 |
| 2,191,840 | 2/1940 | Zap | 244/214 |
| 2,231,226 | 2/1941 | Schwarmayr | 244/214 |
| 2,343,986 | 3/1944 | Leutholt | 244/214 |
| 2,405,726 | 8/1946 | Zap | 244/214 |
| 2,763,448 | 9/1956 | Davie, Jr. | 244/219 |
| 3,008,673 | 11/1961 | Caddell | 244/214 |
| 3,092,355 | 6/1963 | Brown | 244/218 |
| 3,743,218 | 7/1973 | Sweeney et al. | 244/49 |
| 3,904,152 | 9/1975 | Hill | 244/218 |
| 4,460,138 | 7/1984 | Sankrithi | |
| 4,614,320 | 9/1986 | Rutan | |
| 4,685,410 | 8/1987 | Fuller | 244/218 |
| 4,744,534 | 5/1988 | Corbett | 244/218 |

FOREIGN PATENT DOCUMENTS

| 574439 | 7/1924 | France | 244/218 |
|---|---|---|---|
| 698679 | 8/1931 | France | 244/218 |
| 856763 | 8/1940 | France | 244/218 |
| 265724 | 1/1928 | Italy | 244/218 |

Primary Examiner—Galen Barefoot
Attorney, Agent, or Firm—Robert R. Tipton

[57] ABSTRACT

The presented invention gives methods to construct two types and three kinds of variable area aircraft or kite wings. The wings share a common method of increasing or decreasing in area through fixed fuselage or fixed wing spars and opposing travel, travelling wing spars to which spars may be attached described airfoil forms or plates. Doubled back and threaded about these fixed and travelling spars are flexible, strong and laterally stable wing membranes cut in patterns to match the extensible framework of the fixed and travelling spars. The wing varies in area when the travelling spars are mechanically 'gear train' actuated and the as yet un-utilized portion of the wing membrane is drawn from the internal wing stowage space. This unfurling process is reversible, the wing membrane may also be drawn back into the internal wing stowage space. The invention also gives a method to construct wingtip aelerons suitable for one of the two presented types of variable area wing. The attached wingtip aelerons may be actuated at any variable area wing position. Shown are three methods to actuate the described wings to the open and close positions. Also described are some details of the wing's construction and a mechanism which if correctly applied will allow any of the presented wings to retain a calculated or empirically produced optimal wing attitude and trim.

6 Claims, 8 Drawing Sheets

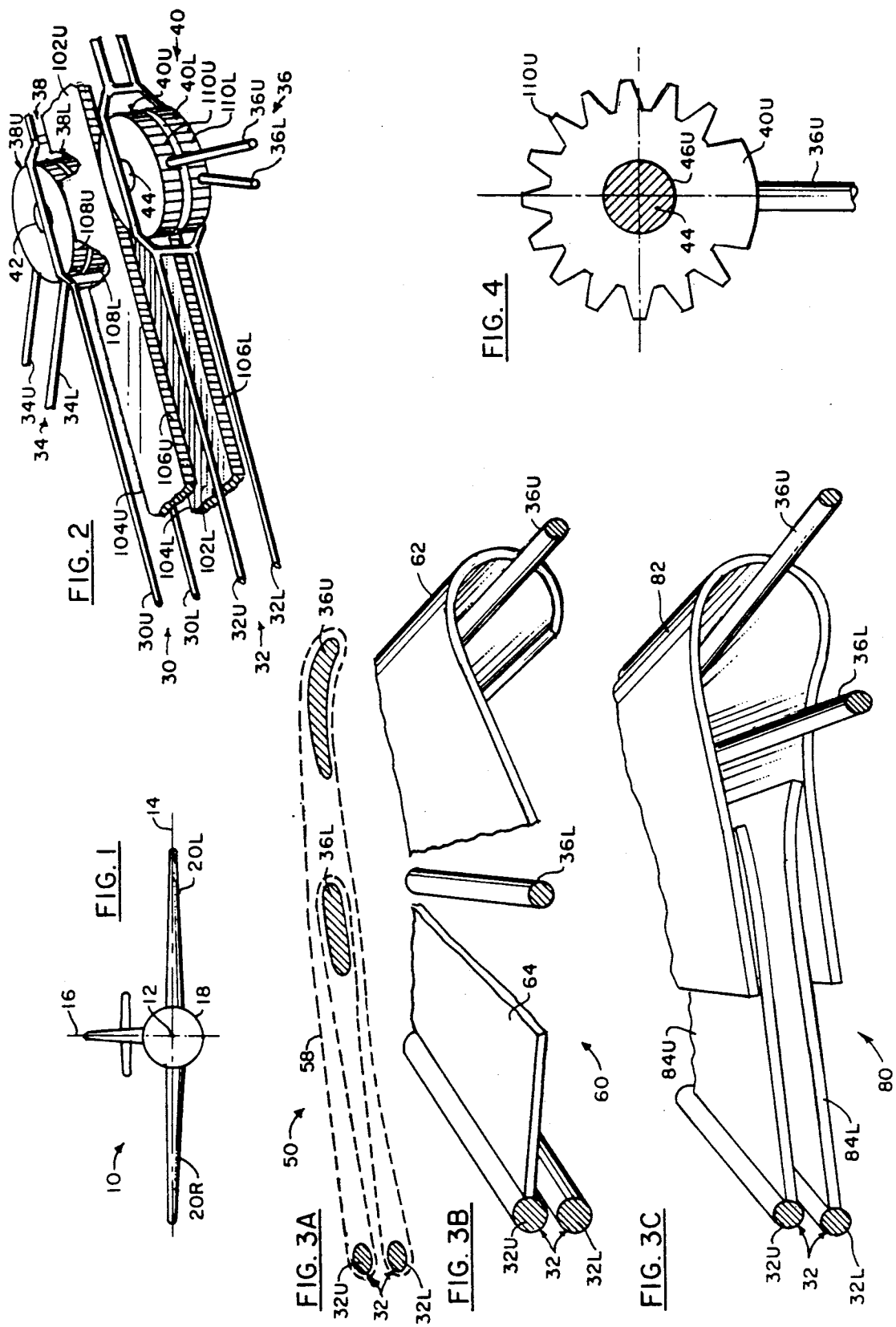

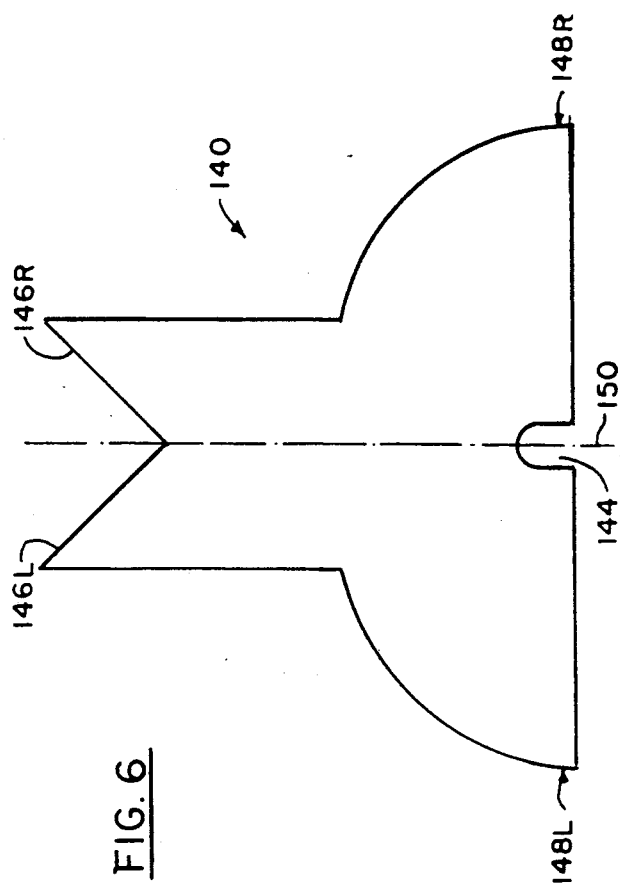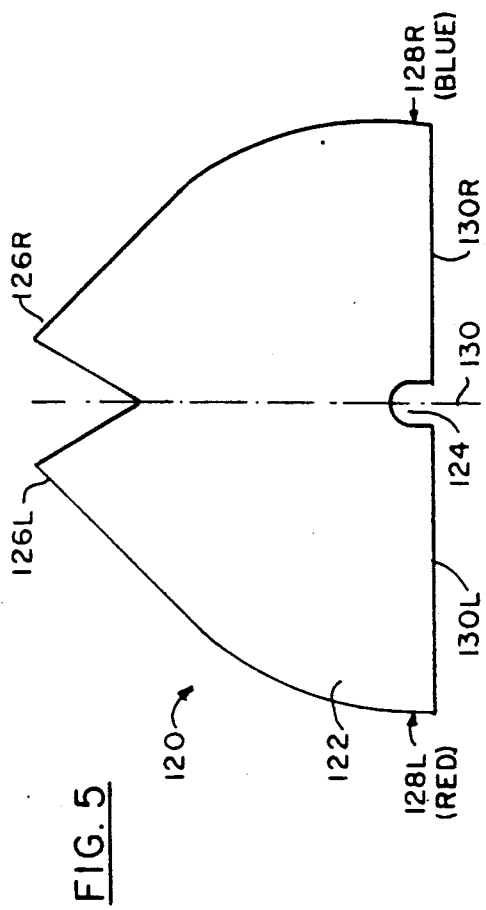

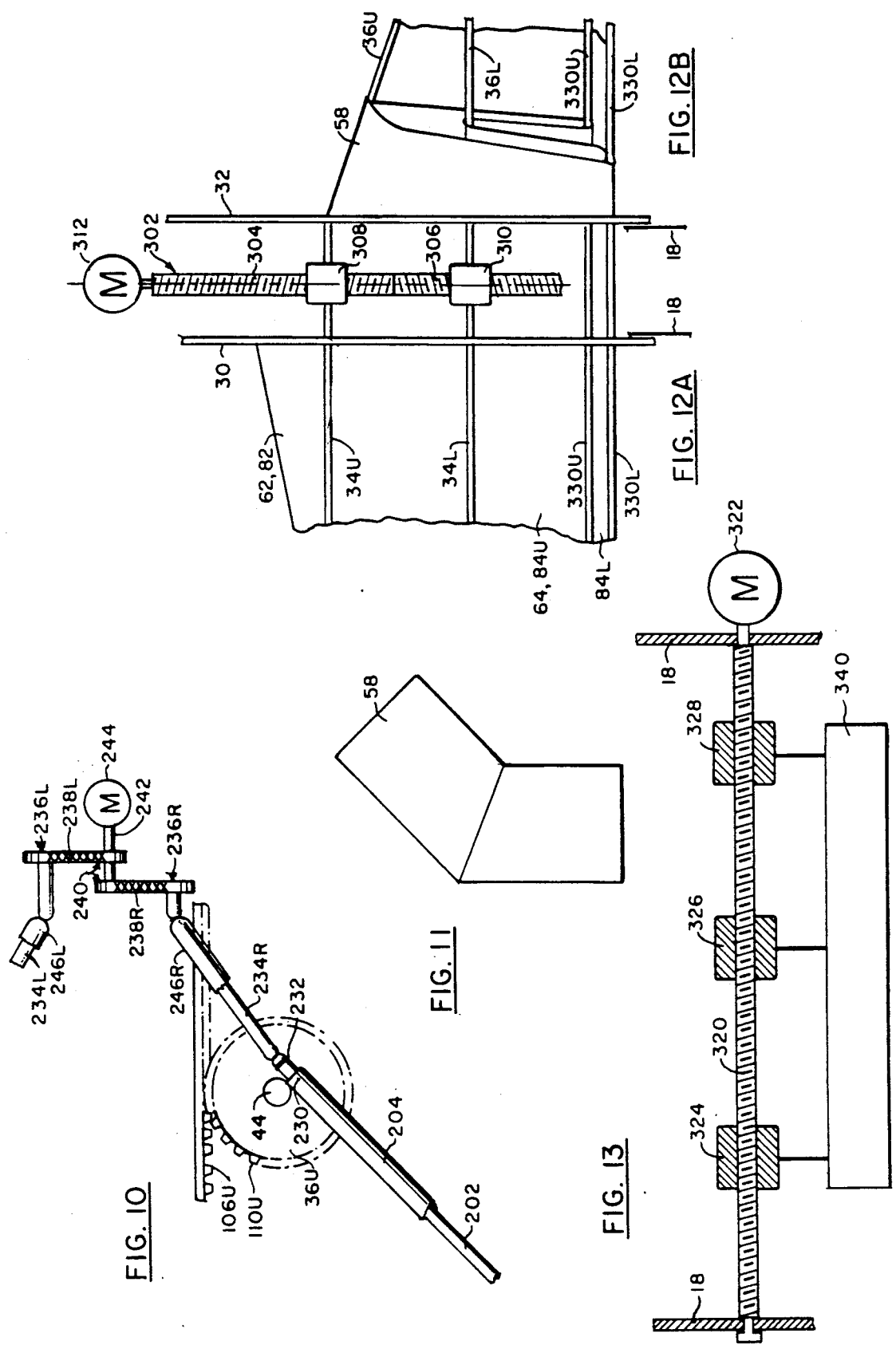

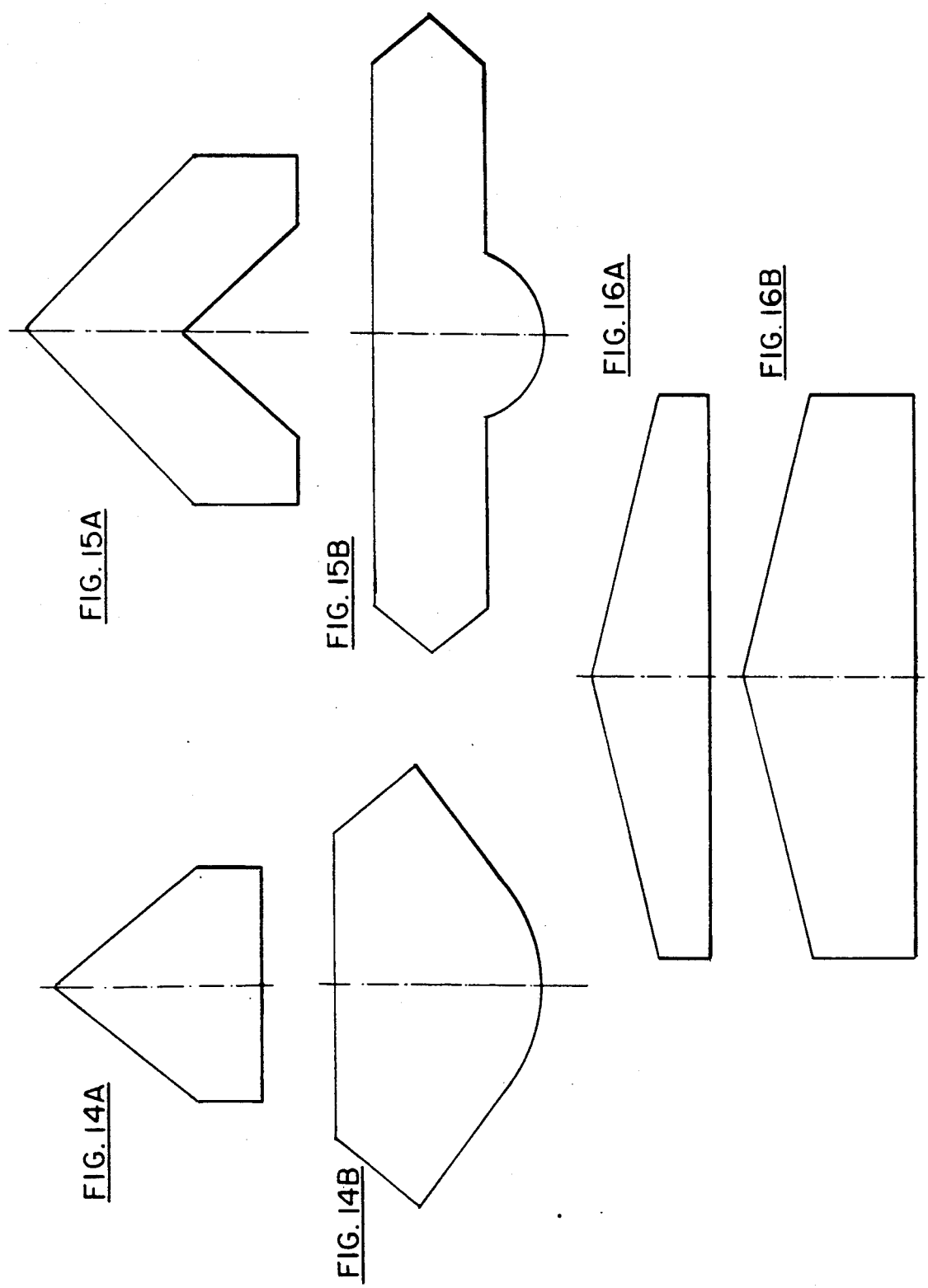

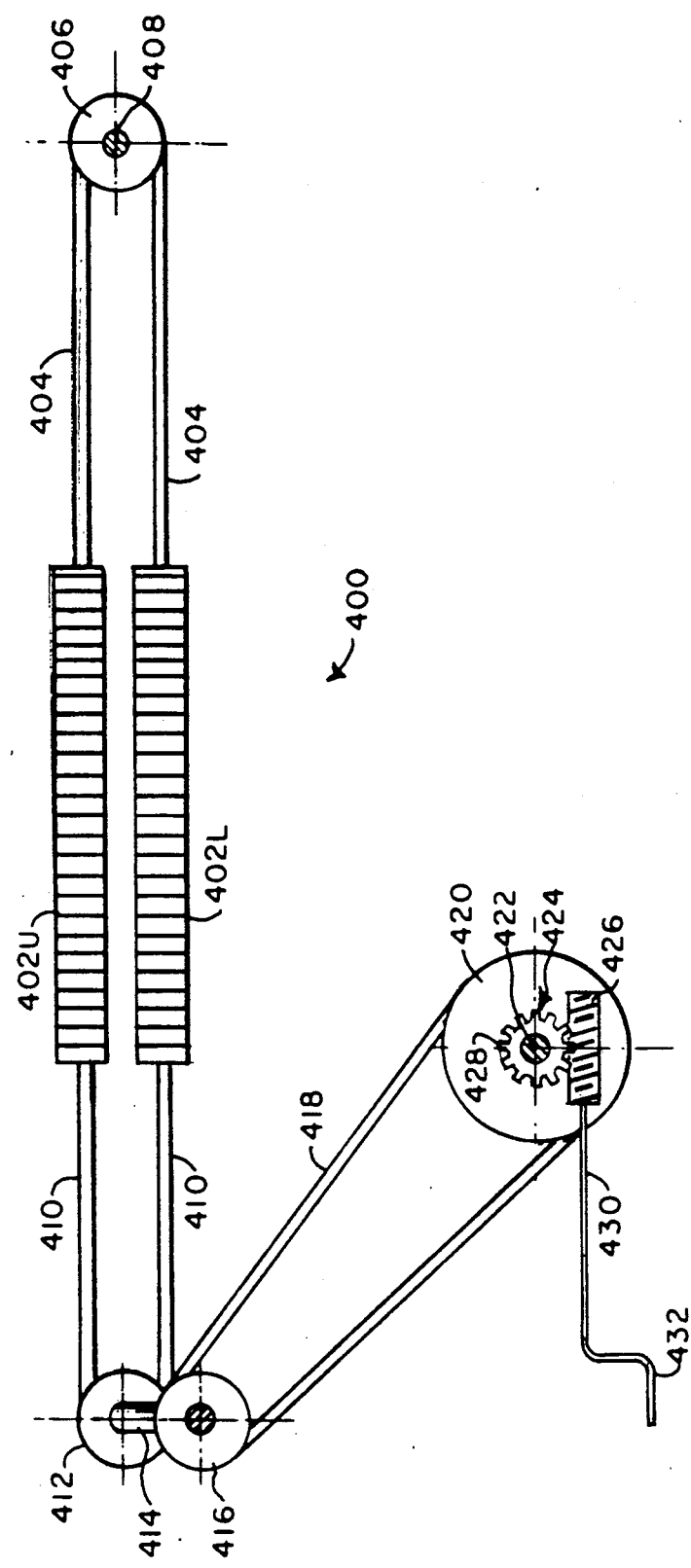

METHOD TO CONSTRUCT VARIABLE AREA, MEMBRANE SPAR AND WING AIRFOIL AIRCRAFT AND KITE WINGS AND SUITABLE AELERONS

This application is a continuation-in-part of application Ser. No. 07/334,683, filed on Apr. 6, 1989, now abandoned.

BACKGROUND OF THE INVENTION

1. Field of the Invention

This invention relates to 'in flight' variable area aircraft wings and in particular to variable area aircraft wings of membrane and wing spar construction.

2. Prior Art

Some in flight variable aircraft wings take the form, in heavy powered aircraft, of a 'SWING WING' where the outer wing but not the wing root rotates laterally forward or back. These create an altered wing lifting profile and altered wing lift moment allowing for required aircraft maneuverability at sub-sonic and supersonic speeds.

Other aircraft wings have the form of a 'TILT' wing which carries propellers that lift the aircraft vertically until the wing is tilted forward to act as a lifting airfoil drawn through 'free air' by the affixed propellers.

Another type of variable wing is the 'SCISSOR' wing which, after extensive initial thrust is applied to the aircraft, is deployed from its 'in line' fuselage housing to swing from the wing's central point across the aircraft's fuselage to act as conventional lifting wing airfoil. However, as stated above the examples given are for heavy powered aircraft and not for a simple light working wing configuration.

SUMMARY OF THE INVENTION

The presented invention presents three methods to construct two types of light aircraft, variable area, spar and optionally attached airfoil formed plates and extensible membrane wing. The aircraft incorporating the present invention would be suitable for manned or unmanned; powered flight, free flight wireless controlled flight or tethered flight. The presented variable area membrane wings may be utilized to carry persons and, or, equipment. They would have the aerodynamic property of being able to take advantage of the available wing lift producing airflow by increasing the externally exposed wing membrane area. This would allow the aircraft to be able to soar upon the wind, and to easily and quickly shed wing area and lift when required, in order to maneuver in the available wing lift producing airflow.

This invention presents methods to construct two forms of the presented first type of variable area aircraft wings. These include the 'full delta' and 'sweptback' wings which work on the mechanical principle of spokelike wing spars which travel in opposing directions. To these spars may be attached airfoil formed plates. Looped around these spars or attached plates are folded and L threaded furled wing membranes. When these spars or plates travel in a radial pattern they allow the constantly taut right and left wing membrane to unfurl (to increasingly expose the external wing membrane as they are drawn from their linearly stowed position in the wing's interior).

Conversely, when the direction of the spars is reversed, the membranes furl back into linear stowage in the wing's interior. This will allow the wing to vary in area and, or, configuration thereby increasing or decreasing the total wing area and wing lift and altering the given 'full delta' or 'sweptback' wing's aerodynamic characteristics.

This invention presents two methods, one motor actuated and one manually actuated, to drive the 'full delta' and 'sweptback' variable area wing mechanisms from close to intermediate positions to open and vice versa.

This invention also presents a method to construct wingtip aelerons suitable for the 'full delta' and 'sweptback' variable area wings. These wingtip aelerons compris wing membrane enclosed wingtip aeleron plates or panels, aeleron control torque rods and an aeleron control torque rod drive mechanism. This aeleron drive mechanism is capable of transmitting, at any wing leading edge wing spar position, such synchronized right and left wing aeleron motion as may be required.

This invention also presents a method to construct, using a furled wing membrane and travelling wing spars but utilizing, as shown herein, different mechanical arrangements, a second type of variable area aircraft wing. It will be referred to as a 'panel' wing which varies the externally presented wing membrane area through the opposing motion of travelling parallel wing spars. Airfoil shapes may be attached to these spars, the whole again producing a 'panel' wing capable of varying wing area and wing lift and consequent alteration of the the wing's aerodynamic characteristics.

This invention presents two methods, one motor actuated and one tether line actuated to drive the 'panel' variable area wing mechanism from close to intermediate positions to open and vice versa.

This invention presents a mechanism to move a trimming 'ballast' weight or weights to and fro along the fuselage centreline of aircraft equipped with the above variable area wings or any variable area wings in order to compensate for the said wing's changing point of moment of lift and resultant change in the aircraft's atitude.

Presented also are two methods of constructing sliding joints which serve to hold airfoil shaped loaded wing members together in alignment and close proximity to each other whilst the wing area is increasing or decreasing.

This invention does not specify a particular type of power source for actuating the various presented mechanisms, but does present two other variable area wing actuating means besides the shown electrically powered motors well known in the art.

BRIEF DESCRIPTION OF DRAWINGS

Symmetry

In all presented wing designs the right and left wings are symmetrical, where applicable, for ease of description, only one wing or common detail of the presented wings and aelerons will be shown in the drawings and referred to in the detailed description.

FIGURES AND DETAILED DESCRIPTIONS

Figure 8A:
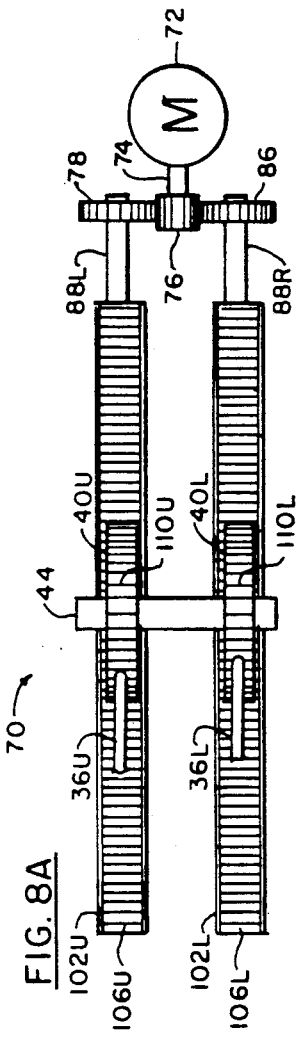

The drawing reference numbers match the Detailed Description article numbers except where noted.

FIG. 1 is a reference of geometric planes conventionally common to aircraft and the presented aircraft wings.

FIG. 2 is a partial illustration of the fuselage spars, wing spars and wing spar hubs of the presented aircraft 'full delta' and 'sweptback' variable area wings.

FIGS. 3A, B and C are sectional views of the simple or kite wing, brief wing and whole wing plates and forms which may be attached to both presented types of wing.

FIG. 4 is a view of a typical wing spar pivot hub which hub is common to the 'full delta' and 'sweptback' variable area wings.

FIG. 5 is a plan view of the right unfolded 'full delta' wing membrane.

FIG. 6 is a plan view of the right unfolded 'sweptback' wing membrane.

Figure 7:
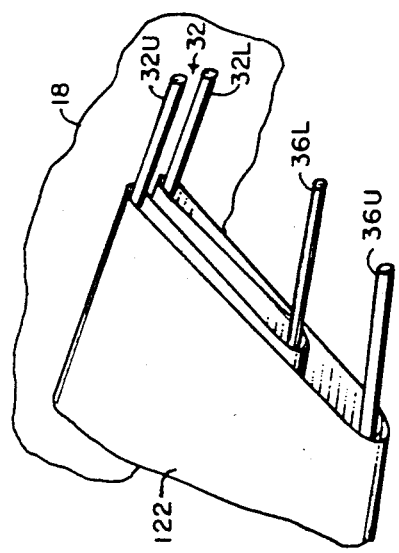

FIG. 7 is an illustration of the threading of the 'full delta' and 'sweptback' wing membranes through the fuselage spar and wing spars of the simple or kite 'full delta' and 'sweptback' wing spars.

Figure 8B:
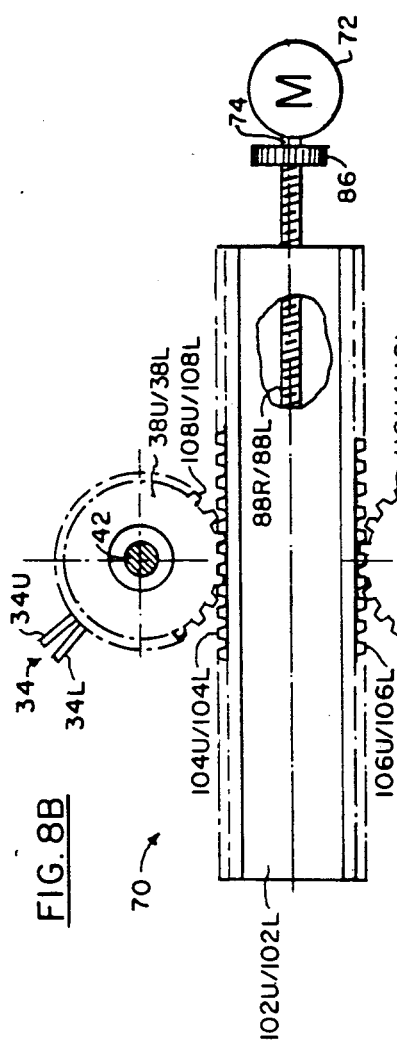

FIGS. 8A and 8B are a plan and side view of the 'full delta' and 'sweptback' wing travelling wing spar mechanism.

Figure 9:
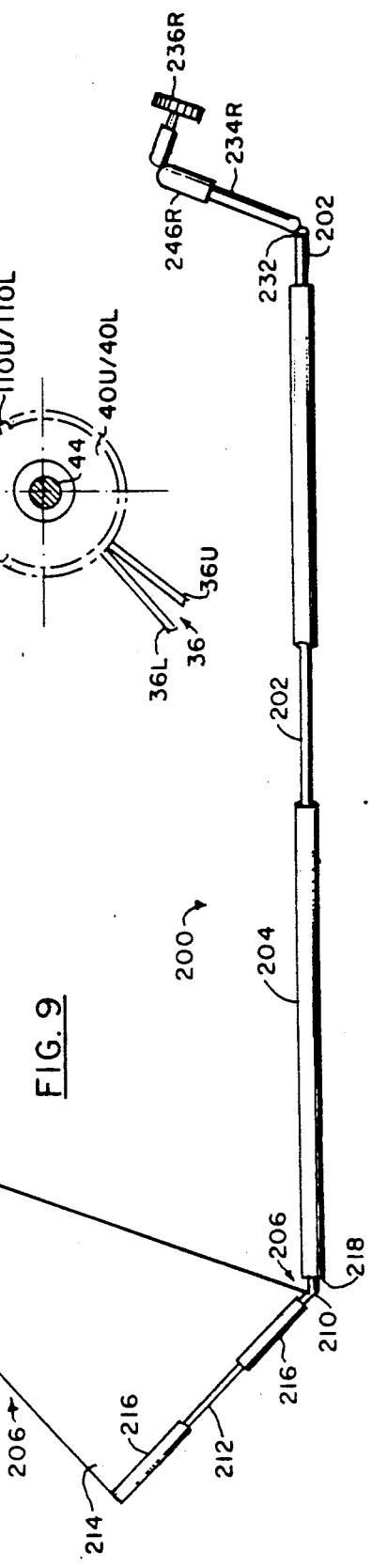

FIG. 9 shows the right aeleron control torque rod drive train assembly and plate common to both 'full delta' and 'sweptback' wingtip aelerons.

FIG. 10 shows the upper travelling wing spar mechanism and aeleron control torque rod drive mechanism common to both 'full delta' and 'sweptback' wings.

FIG. 11 is a plan view of the right unfolded 'panel' wing membrane.

FIGS. 12A and B show the method of moving the travelling, variable area 'panel' wing spars in opposite directions along the aircraft fuselage's centreline.

FIG. 13 shows the method for re-locating the aircraft's trimming ballast along the aircraft's fuselage centreline.

FIGS. 14A and 14B show the 'full delta' variable area wing in close and open positions.

FIGS. 15A and 15B the 'sweptback' variable area wing in close and open positions.

FIGS. 16A and 16B show the 'panel' variable area wing in close and open positions.

NOTE: Articles corresponding to FIGS. 14, 15 and 16 are non-existent.

FIG. 17 shows the main mechanical elements of a method to manually operate the 'full delta' and 'sweptback' variable area wings.

Figure 18:
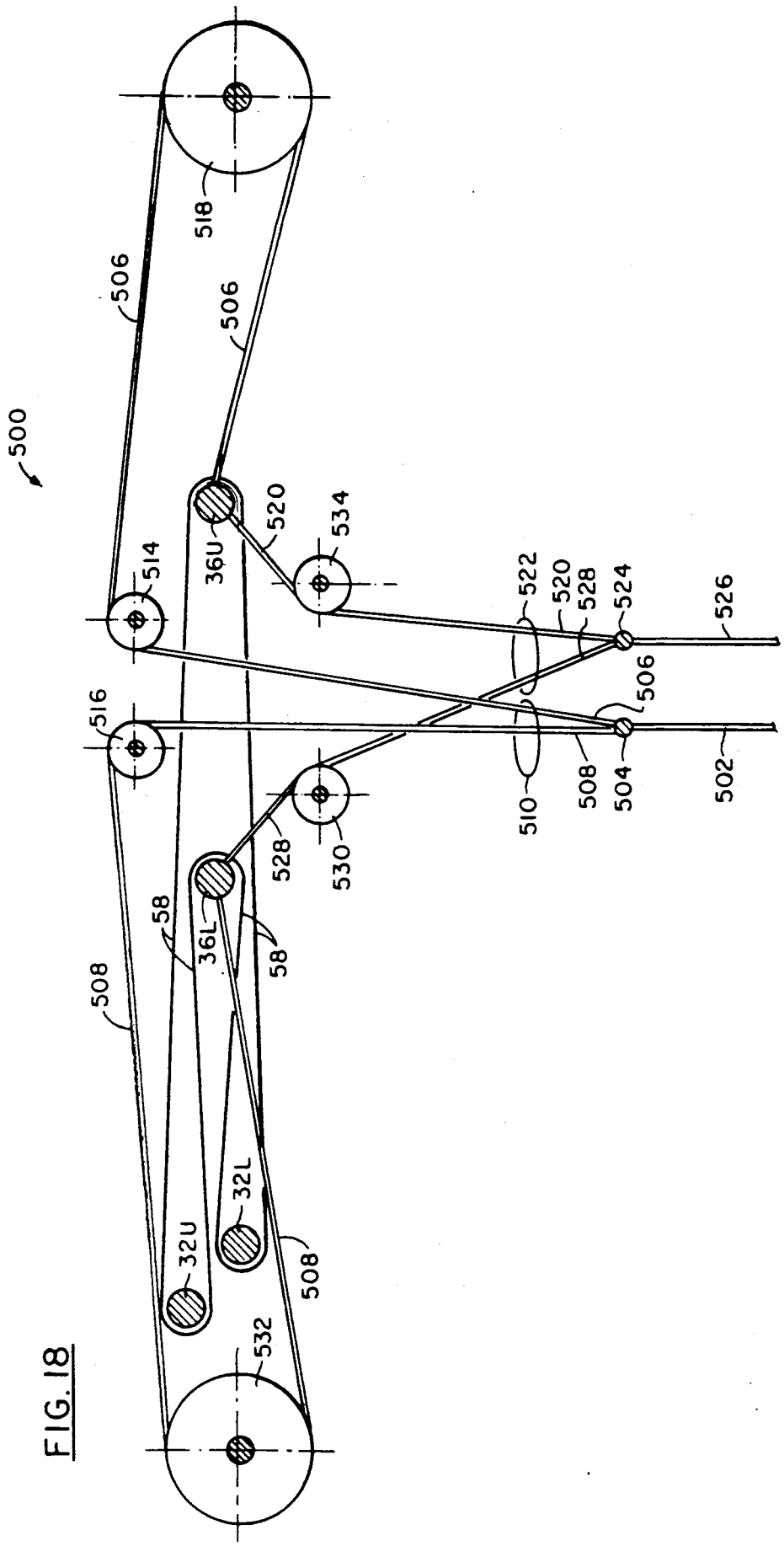

FIG. 18 shows the main elements of a method, through the use of tether lines, to operate the 'panel' variable area wing.

Figure 19A:
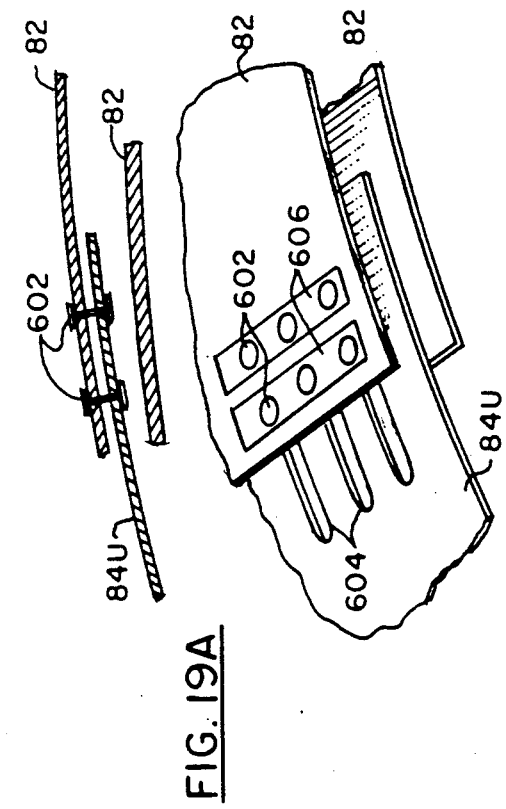

FIGS. 19A and B show details of wing airfoil shaped plate and wing airfoil shaped form mobile slip joints.

Figure 20A:
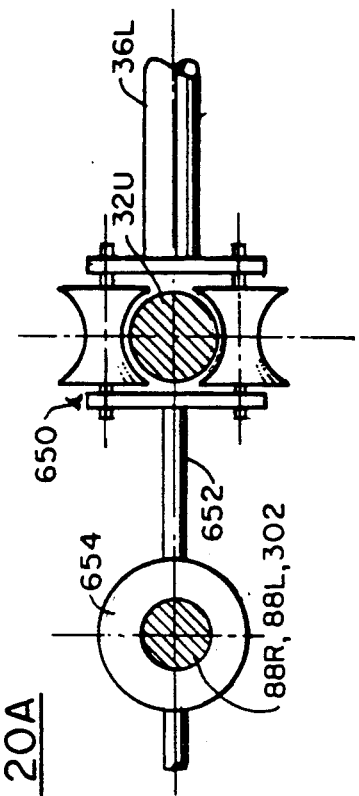

FIGS. 20A, B and E show details of the variable area 'panel' wing spar and fuselage spar rolling connections.

DESCRIPTION OF THE PREFERRED EMBODIMENT

Wing Membranes

Wing membranes are constructed from material having at least the properties of being laterally stable, flexible, strong, waterproof, lightweight and impervious to wind. Simple examples of materials considered suitable for the presented variable area wing membranes are nylon rip-stop fabrics, toughened (layered) mylar or metal foil or chain-mail. The wing membrane serves two functions;

1. The membrane serve as the external wing surface and

2. In the presented variable area wings the loaded wing membrane will be under tension which tension will tend to hold the wing members in a constant and stable structure.

Spars, General

Spars are wing membrane contacting members fashioned into useful dimensions of solid or annular, round elliptical, rectangular or suitably applicable airfoil shape. Spars may be made of any material suitable for the purposes of the presented variable area wing's use. They may even be shaped into whole wing airfoils themselves. However, for ease of aircraft assembly and dis-assembly, where desirable, separately constructed wing airfoil shapes can be inserted over or around the wing or fuselage spars and into the loops of the wing membrane. This would allow for a multiplicity of wing airfoil shapes and wing configurations for various and, or, specific uses. Such uses or conditions might include prevailing headwind or tailwind, low and high altitudes, long distance, stunt, variable wind, updrafts, etc. flying conditions.

For ease of explanation the presented 'full delta', 'sweptback' and 'panel' variable area wing's membrane contacting member although individually identified, will be referred to simply as 'spars' throughout the description of this invention and, except for FIG. 3A, (airfoil shaped wing spars) where they will be shown as round rods.

Wing Airfoils

In order to have the presented variable area wings be more aerodynamically efficient than a simple 'stick' or airfoil shaped spar (KITE OR SIMPLE AIRFOIL WING), supplemental airfoil formed shapes may be introduced to form the wing's cross sectional shape.

Airfoil shapes can be introduced into the wing cross section by means ranging from the installation of upper and lower sets of shaped rods trailing back from the leading edge of the wing to give the tensioned wing membrane somewhat of an airfoil shape, to enclosing both wing and fuselage spars with substantial (bulky) airfoil shaped members suitably formed for their location in the wing. Through utilization of these shape attachments many airfoil forms and wing configurations become possible.

Formed shapes which are installed in the presented BRIEF AND WHOLE WING airfoils should be made of a material having at least the properties of being stiff, formable or easily machinable resilient, strong, waterproof and lightweight.

In the presented invention, for all such airfoil formed shapes of the variable area wings, any greatly curved, i.e. doubled over, wing leading edge airfoil will be referred to as 'form' while the gently curved aft or trailing part of the wing airfoil will be referred to as a 'plate'.

In utilizing airfoil shaped wing inserts, these forms or plates will tend to rotate about their attached fuselage or wing spars but they can attached to their respective spars by hinged or sliding connections. Restraint upon the rotation or movement of such forms or plates about their supporting spars will be imposed by the taut and loaded wing membrane. In an intermediate airfoil wing (BRIEF AIRFOIL WING), these shaped forms or plates may be wing spar or fuselage spar supported airfoil forms or plates which lead unsupported sections of the loaded wing membrane to hold an aerodynamic airfoil shape.

NOTE: Owing to the very broad range of cross-sectional wing shapes and configurations, there will be a variance in wing lift results and behaviour at different wing positions, even for the kite or simple wing. Different forms of wings could have single or multiple 'sweet' spots, lag spots and even stall spots. Any theorizing on the wing's performance will be up in the air.

WING AIRFOIL SHAPES. SIMPLE, BRIEF AND WHOLE

Kite or Simple Wing

In the simplest of the presented variable area wings the wing spar cross sections may or may not have airfoil shapes.

Brief Airfoil Wing

In the brief variable area wing the airfoil shaped wing or fuselage spars, forms and plates do not extend over the entire wing membrane. They may have supplemental, independently travelling or linked, wing membrane supporting spars or forms or plates attached to the wing spars and, or, fuselage spars to support the wing membrane and give the brief variable area wing essentially an airfoil shape.

Whole Airfoil Wing

The most aerodynamically fluent and lift producing variable area wings can be made by keeping the taut, wing structure restraining, wing membrane to hold an aerodynamic optimal shape. This is achieved by attaching to the wing leading edge spar a shaped form which extends over the whole of the close position variable area wing. A gently curved airfoil plate can then be inserted into a suitably located cavity in said form. These curved plates may be attached to the trailing wing spar or either or both of the fuselage spars and project into the interior of such cavity.

In the 'panel' wing, the trailing plate(s) are attached to one or both of the stationary trailing spars depending upon the juxtaposition of those spars. These stiff, whole wing airfoil forms and plates could be fastened to each other along the wing's length by a continuous slip joint (FIG. 19). The slip joint will allow the plates and forms to easily slide past each other and the variable area wing membrane. At the same time the plate's and form's surfaces will be brought into constant contact with each other over an adequate load bearing area.

In both types of variable area wings, where desirable, a hinged joint allows the forms or plates to rotate about their spars in adjustment to the change in angle caused by the wing's broadening as the loaded wing airfoil forms slide ast the loaded wing airfoil plates.

[1] REFERENCE ILLUSTRATION. FIG. 1

Shown is a front view of an aircraft 10 looking along the longitudinal centreline 12 of the fuselage 18. The purpose of this illustration is to name, for reference, the geometric planes of the herein described aircraft, variable area wings. The lateral plane 14 is considered to be that longitudinal, horizontal plane in which aircraft wings 20L and 20R conventionally lie. The dorsal plane 16 is considered to be that longitudinal, vertical plane which intersects the lateral plane 14 at right angles. The front and rear of the aircraft 10 will be referred to as forward and aft or after. Wing leading edges or wing spars which project from the fuselage 18 and lead back toward the after part of the aircraft 10 will be referred to as 'aft leading'.

As stated in the brief description of drawings, in the presented variable area wings the right and left wings are symmetrical. It should be understood that where relavent and for ease of description, details of only one wing of the presented 'full delta', 'sweptback' and 'panel' wings will be described and, or, referred to.

2 'FULL DELTA' AND 'SWEPTBACK' VARIABLE AREA WING 6. FUSELAGE SPARS AND WING SPARS. FIG. 2

Fuselage Spars

Shown in FIG. 2A, laying laterally along each side of the fuselage 18 and fastened to the fuselage 18 fore and aft, are two (2, left and 2, right) spars 30 and 32 which spars have a continuously smooth exterior surface. Each spar comprises an upper spar and lower spar. Fuselage spar 30 comprises upper spar 30U and a lower spar 30L. Spar 32 comprises upper spar 32U and lower spar 32L. These spars may be straight or appropriately curved to form the fuselage contacting wing membrane into an airfoil shape.

In the aircraft's dorsal plane 16, the longitudinal centres of each of the two fuselage left and two fuselage right wing spars 34U, 36L and 36U, 36L are positioned one above the other. The longitudinal centres of the upper right and upper left fuselage wing membrane spars 34U and 36U, respectively, lie in the same lateral plane as each other, as do the centres of the lower right and lower left fuselage wing membrane spars 34L and 36L, respectively. The fuselage spars 30 and 32 may have wing support members or plates (see FIGS. 3B and 3C) firmly but detachably connected to them.

The upper fuselage wing membrane spars 30U and 32U and same side wing leading edge spars 34U and 36U lay generally in the same lateral plane, as do the same side lower fuselage wing membrane spars 30L and 32L and wing major spars 34L and 36L, except as noted.

Wing Spars

Projecting laterally and symmetrically from each side of the aircraft's fuselage in an aft leading configuration are optionally detachable wing spars 34 and 36 which lie in the aircraft's lateral plane 14. Design allowance can be made for any digression from said lateral plane for any anhedral or dihedral wing atitude or wing leading edge airfoil shape.

Using tailored wing membranes (FIGS. 5A and 5B) and shaped detachable wing spars and, or detachable airfoil shaped forms and plates (see FIGS. 3B and 3C), differing variable area wing patterns and wing configurations may be produced. These spars or airfoil shapes can be firmly attached to the fuselage 18 and its mechanisms (not shown in FIG. 2).

This would include the concave or convex curved wing leading edge patterns, gull wing or inverted gull wing leading edge profiles or even multiple wing configurations e.g. double stacked variable area 'full delta' 'sweptback' or 'panel' wings or combinations of said wings.

3 'FULL DELTA' AND 'SWEPTBACK' VARIABLE AREA WINGS; SIMPLE, BRIEF AND WHOLE WING AIRFOIL FORMS AND PLATES. FIGS. 3A, 3B and 3C

Simple or Kite Wing Airfoil Form 50

FIG. 3A shows the fuselage upper and lower spars 32U and 32L, respectively, the airfoil shaped wing major spar 36L, the airfoil shaped wing leading edge spar 36U and, in the form of a dotted line, the wing membrane 58.

Brief Wing Airfoil Form 60

Shown in FIG. 3B is an example of the described brief airfoil form and plate 60. The partial view looks along the spars toward the front of the aircraft. The wing member arrangement of this brief airfoil form of variable area wing comprises, fuselage spars 32U and 32L, the affixed brief, fuselage spar airfoil plate 64, the wing leading edge spar 36U, the affixed brief, wing leading edge airfoil form 62, and the wing major spar 36L. Not shown in FIG. 3B are the wing membrane, and any supplementary wing membrane support spars or wing airfoil forms or plates.

Whole Wing Airfoil Form 80

Shown in FIG. 3C is the wing member arrangement in this form of variable area wing. Shown are the fuselage spars 32U and 32L, the affixed fuselage spar whole wing airfoil single plate or doubled plates 84U and 84L. The single plate 84U can connected to either of the fuselage spars 30U, 32U or 30L, 32L. The doubled plates may each be connected to a fuselage spars 30U, 32U, 30L and 32L. Also shown are the wing leading edge spar 36U, the affixed leading edge whole wing airfoil form 82 and the wing major spar 36L. Not shown is the wing membrane that covers the entire configuration.

4 Wing Spar Pivot Hubs, 'Full Delta' and 'Sweptback' Wings. FIG. 4.

Very firmly affixed to or detachably connected to the fuselage located ends of the wing leading edge spars 36U and 36L and the wing major spars 34U ane 34L, respectively, (FIGS. 3A, 3B and 3C) is a typical wing spar pivot hub 40U (see also FIG. 2). These hubs are constructed of a material which meets all requirement for the intended application. The hubs are identically disc shaped and identically sized. Each is provided with a common face-central round hole 46 of a size suitable to allow the suitable passage of the respective right or left wing round wing spar pivot hub kingpins 42 and 44, respectively (see FIG. 2), said hubs and kingpins being the fuselage's load bearing, wing lifting connection.

The right wing configuration shown in FIG. 2 is as follows: With the right wing spar pivot hub kingpin 44 inserted through the central wing spar pivot hub holes 46, the right wing leading edge spar pivot hub 40U and the right wing major spar pivot hub 40L are aligned in such a way so that the hub perimeters, when said hubs rotate in opposite directions, maintain a sturdily constant and precise relation to each other. These hubs or disks 40U and 40L are laid flat, one above the other, in line with the aircraft's lateral plane 14.

Between the hubs or disks is placed an adequately sized washer not shown made of a suitable friction-free material. The longitudinal centres of the round wing spar pivot hub kingpin holes 46 lie, one above the other, in line with the aircraft's dorsal plane 16. The kingpins 42 and 44 of both wings become the common centre of arcs described by the travelling right wing leading edge spar 40U and travelling right wing major spar 40L. Right and left sides are the same configuration.

Securely affixed to or integral to the periphery of each wing spar hub disk 38U, 38L, 40U and 40L and projecting laterally into the interior of the aircraft's fuselage is a pair of upper and lower long nuts 102U and 102L. Long nuts 102U and 102L are each provided with a continuous set of rack gear teeth 104U, 106U and 104L, 106L, respectively, along their side edges.

Rack gear teeth 104U and 104L are adapted to engage gear teeth 108U and 108L, respectively, of hubs 38U and 38L. Rack gear teeth 106U and 106L are adapted to engage gear teeth 110U and 110L, respectively, of hubs 40U and 40L.

5 Wing Membrane, 'Full Delta' Wing. FIG. 5

The wing membranes of both left and right wings begin as modified semi-circular shapes 120 symmetrical about centerline 130. For ease of explanation only the right wing membrane 120 is shown (FIG. 5).

A semi-circular hole 124, cut at the centre of the shape's straight edge allows for the introduction of the wing spars, typically, spars 36U and 36L (FIG. 2), in the simple kite wing example once the wing is folded. This prevents the wing membrane root from binding or snagging about fuselage spars 30 and 32 (FIG. 2) in that area of the actuated variable area wing.

For ease of following the description in Article 7, looking directly at the shown semi-circular wing membrane 120 expanse, the membrane's left side 128L will be named the red side and the membrane's right side 128R will be named the blue side. The 'full delta' wing membranes have continuous membrane 'gussets' 126L and 126R which will eventually cover the wingtip aeleron surfaces. Optional fastening flaps 130L and 13R are shown.

6 Wing Membrane, 'Sweptback' Wing. FIG. 6

The 'sweptback' wing membrane 140 symmetrical about centerline 150 is a slightly modified version of the 'full delta' wing membrane pattern as illustrated in the accompanying drawings (FIG. 6). Again, a semi-circular hole 144, cut at the centre of the shape's straight edge allows for the introduction of the wing spars, typically, spars 36U and 36L (FIG. 2), in the simple kite wing example once the wing is folded. This prevents the wing membrane root from binding or snagging about fuselage spars 30 and 32 in that area of the actuated variable area wing.

The outer whole wing membrane away from the furling and unfurling 'sweptback' wing membrane may have the form of a light weight, fine toothed zippered sock. This sock can be internally framed with shaped and attached wing stiffening spars or whole wing airfoil forms such as those shown in FIGS. 5A, B and C.

The wing major spar and furling or unfurling membrane location may be stiffened by a wing root airfoil plate. This root wing airfoil would project from the fuselage spars and may or may not insert into a cavity provided in the outer wing. Typical configurations are shown in FIGS. 3A, B and C.

Depending on the extent of the variable area 'sweptback' wing's major spar and fuselage spar wing membrane contact area, the 'sweptback' wing leading edge spar could virtually be the sole fuselage lifting wing member. An example of this leading edge spar 36U is illustrated in FIGS. 3A, 3B and 3C.

This would be unlike the variable area 'full delta' wing membrane which distributes the fuselage lifting wing membrane load with the 'full delta' wing leading edge spar, wing major spar and full length fuselage spars. The 'sweptback' wing membrane 140 is provided with continuous membrane gussets 146L and 146R. These gussets 146L and 146R will eventually cover the wingtip aelerons. Optional fastening flaps 148L and 148R are shown.

7 Wing Membranes, Threading Through Fuselage Spars and Wing Spars. 'Full Delta' and 'Sweptback' Wings. FIG. 7

Because the variable area 'full delta' and 'sweptback' wing configurations and wing membrane patterns are closely similar, only the right 'full delta' wing membrane 122 (FIG. 5), fuselage spars and wing spars will be described. The right wing leading edge spar 36U (see also FIG. 3A), with or without an airfoil form, is laid along the line formed by the meeting of the above mentioned (Article 5) red and blue membrane segments 128L and 128R, respectively, of FIG. 5 at centerline 130.

The blue side 128R is folded over the wing leading edge spar 36U bringing the blue side and red side straight edges 130L and 130R, respectively, in line. Both edges 130L and 130R are brought to the fuselage where the red edge 128L is lead under and back over the lower right fuselage spar 32L while the blue edge 128R is lead above and back under the upper right fuselage spar 32U. Both red and blue right wing membrane edges 128L and 128R are then led away from the fuselage 18 toward the wing leading edge spar 36U, the blue membrane 128L edge passing over and the red membrane 128R edge passing under the wing major spar 36L.

Between the leading edge wing spar 36U and wing major spar 36L these edges 128L and 128R are firmly but detachably fastened to each other in a continuously smooth fashion. This joint location is chosen arbitrarily for ease of description.

8 Variable Area Wing Drive Mechanism and Theory of Operation. 'Full Delta' and 'Sweptback' Wings FIGS. 8A and B shows a wing leading edge and wing main spar actuating apparatus 70 identical to the actuating apparatus of FIG. 2. Spar actuating apparatus 70 includes a driving device 72 capable of clockwise or anti-clockwise rotation. Firmly affixed to the shaft 74 of this driving device 72 is a circular spur gear 76. This spur gear 76 commonly meshes with and drives, in opposite directions, two other mated, circular spur gears 78 and 86. Each of these spur gears 78 and 86 is firmly attached to right or left handed threaded rods 88L and 88R and are of the same diameter and length. Threaded rods 88L and 88R lay along the longitudinal fuselage centreline with the longitudinal centreline's of rods 88L and 88R positioned one above the other in line with the aircraft's dorsal plane 16. These threaded rods are free to rotate easily but otherwise are firmly but detachably affixed to the frame of the aircraft fuselage 18 (not shown in FIGS. 8A and 8B).

Threaded onto each of these rods are flat 'long nuts' 102U and 102L. Long nuts 102U and 102L may be of any useful width or thickness and have suitable lengths of continuous rack gear teeth 104U, 104L, 106U and 106L projecting laterally from both sides. Long nuts 102U and 102L, with affixed rack gears 104U, 104L, 106U and 106L, are fastened in such a way as to restrain motion in all directions except that they are free to move back and forth easily when the threaded rods 88L and 88R so move them.

Rack gear teeth 104U and 106U of upper long nut 102U are adapted to engage the matching geared teeth 108U and 110U of the wing w leading edge spar upper pivot hubs 38U and 40U, respectively. Rack teeth 104L and 106L of lower long nut 102L are adapted to engage the matching geared teeth 108L and 110L of the wing major spar pivot hubs 38L and 40L, respectively. All engaging gears and threads are compatible.

Theory of Operation

In the wing's minimum area configuration, the wing major spars 34L and 36L (FIG. 8B), around which the wing membrane are threaded, nest respectively behind their wing leading edge spars 34U and 36U. When the driving motor 72 rotates, in a preset clockwise or counter-clockwise direction, the spur gear train 76, 78, 86 turns the threaded rods 88L and 88R in opposite rotations. This causes the long nuts 102U and 102L and affixed rack gears 104U, 104L, 106U and 106L to move in opposite directions.

In the wing's opening mode, the wing major spars 34L and 36L move through an arc aft and away from the wing leading edge spars 34U and 36U, respectively, toward the fuselage wing membrane spars 30U, 30L, 32U and 32L, respectively. At the same time, the wing leading edge spars 34U and 36U, which carry the aeleron control torque rods and their conduits (Article 9 and FIG. 9) move through an arc laterally forward and away from the wing major spars 34L and 36L and fuselage spars 30U and 30L, respectively. This causes the constantly taut 'stowed' wing membrane 58 (FIG. 3A) or 122 (FIG. 7) to be unfurled at the fuselage membrane spars, thereby increasing the root angle of the 'full delta' wing and varying the exteriorly presented area of the right and left wing membrane surfaces. For the 'sweptback' wing the process is the same. This process is reversible.

9 Aeleron Control Torque Rods. 'Full Delta' and 'Sweptback Wings' FIG. 9

The aeleron control torque rod 202 of aeleron system 200 runs through a conduit 204. Aeleron conduit 204 can be located within the interior of any attached wing leading edge airfoil shaped form 62 or 82. They can also be attached to the wing leading edge spars 34U or 36U. They can also be located in the annular spaces of the wing leading edge spars 34U and 36U. In such a configuration, leading edge spars 34U and 34L would be hollow tubes and perform the same function and aeleron conduit 204.

The aeleron control torque rods 202 project, at the wingtips 206, from the outermost points 208 of their conduits 204. At those exit points 208, a sharp bend, set or connection 210, in the aeleron control torque rods 202 leads the remainder or control rod extension member 212 of said rods to lie in the aircraft's lateral plane 14. In the wing's close (minimum wing area) position, rods 212, for both left and right wings, would be somewhat parallel to the fuselage's longitudinal centreline 12.

Aeleron stiffening plates 214 are loosely attached to the protruding aeleron control rod extension member 212 by a restrained slip join connection 216. This connection 216 (1) allows the aeleron stiffener plate 214 to move about the protruding aeleron control rod extension member 212 (2) allows the aeleron stiffener plate 214 to slide along said aeleron control rod extension member 212 (3) prevents the aeleron stiffener plate 214 from interfering with the easy rotation of the protruding aeleron control rod extension member 212 and (4) does not allow the aeleron plate 214 to slide off the protruding aeleron control rod extension member 212. The provided wing membrane aeleron flaps 126L and 126R (FIG. 5) or 146L and 146L (FIG. 6) are folded around and secured about these aeleron plates 214.

At the hub ends of the wing leading edge spars 34U and 36U the aeleron control torque rods 202 project from the wing leading edge spar conduits 202. These torque rods 202 are firmly but detachably fastened so that they can easily rotate but not slide in or out of said conduits. They can be rotated by operation of chain sprockets 236R or 236L in conjunction with universal joints 234R and 234L and telescoping sleeves 246R and 246L of the aeleron actuation mechanism of FIG. 10.

10 Aeleron Aactation Mechanism and Theory of Operation, 'Full Delta' and'Sweptback' Wings. FIG. 10 Shows the Right Wing Housed in the right wing aeleron control torque rod conduit 202, which conduit is connected at 230 to the shown wing spar pivot hub 36U, is the aeleron control torque rod 202. Connected firmly but detachably at 232 to the the aeleron control torque rod 202 is one end of one of two double jointed telescoping universal joints 234R-246R and 234L-246L. The other ends of these universal joints 234R-246R and 234L-246L are connected, respectively, to the centres of identical right and left circular roller chain sprockets 236R and 236L. The shafts of these sprocket's lie above the plane of the wing leading edge spar pivot hubs and are connected to the fuselage in such a way as to allow the sprockets 236R and 236L to freely rotate but not otherwise move.

These sprockets 236R and 236L are slightly staggered fore and aft in order to allow centrally located clearance for two closely adjacent roller chains 238R and 238L. Roller chains 238R and 238L are adapted to connect the telescoping universal joints 234R-246R and 234L-246L are connected, at right and left sprockets 236R and 236L, to a double roller chain sprocket 240. Double roller chain sprocket 240 is firmly connected, at the double sprocket's centre, to the shaft 242 of the aeleron control torque rod's actuating device 244.

Theory of operation, when the above described aeleron torque rod driving device 244 rotates through a limited distance in either clockwise or counter-clockwise direction, the driven double roller chain sprockets 240 turn both engaged aeleron control torque rod chain sprockets 236R and 236L in the same direction. This imparts axial rotation through the universal joints 234R and 234L to the otherwise fixed and stationary aeleron torque rods 202 causing the connected aeleron panels 206 (FIG. 9) to move respectively up and down or vice-versa.

As the wing spar pivot hubs 36U and 34U rotate when the variable area wing drive device 72 (FIGS. 8A and 8B is actuated, the distance between the ends of the pivot hub 36U attached aeleron torque rod's conduits 204 (for both the left and right wings) and the stationary driven chain sprockets 236R and 236L will increase or decrease. The telescoping universal joints 234R and 234L will continuously take up that dimensional difference.

'Panel' Variable Area Wing

11 'Panel' Wing Membrane Pattern. FIG. 11

The aft leading, wing leading edge spar or wing leading edge form 62 or 820, as shown in FIG. 12, allows the first fold of the 'panel' wing membrane 58 (shown in FIG. 11) over the 'panel' wing leading edge spar 34U or 36U to bring both sides and edges of the shown wing membrane 58 into line. The combined opposing motions of the wing leading edge spars 34R and 36U and wing major spars 34L and 36L cause the folded and threaded 'panel' wing membrane to unfurl and furl evenly behind the aft leading wing leading edge spar or form.

12 'Panel' Wing Spars, Fuselage Spars, Whole Wing Airfoil Threading of Wing Membranes, Actuating Mechanism and Theory of Operation. FIGS. 12A and 12B FIG. 12A shows partial left half detail and FIG. 12B shows partial right half detail of two possible ways of producing the same wing leading edge aft leading angle. The simple kite wing leading edge spar 36U with an optional set or bend in said spar is shown on the right FIG. 12B, while a straight wing leading edge spar with an attached angled brief or whole wing airfoil form 62 or 82 is shown on the left of FIG. 12A.

Wing Spars

FIG. 12 shows a partial plan view of 'panel' wing equipped aircraft right and left fuselage spars 30 and 32 and right and left wing spars 34 and 36. The wing members, with any optionally attached spar airfoil forms or plates, comprise the wing leading edge spars 34U and 36U, the wing major spars 34L and 36L, the 'panel' wing trailing spars 330 which is made up of two spars 330U and 330L which are parallel and positioned so that the wing lifting airflow is not spoilt.

These two wing trailing spars 330U and 330L are placed in such a way as to allow ease of passage for two wing membrane thicknesses between them and, in the presented variable area 'panel' wing, remain stationary and fixed to the fuselage 18 in order to provide a satisfactory place to anchor the 'panel' wing membrane and to provide an anchor for any trailing wing aeleron control surfaces.

Thin-wall tubing (not shown) may be placed over these spars 330U and 330L, which tubes can rotate easily. These tubes allow the taut wing membrane 58 to roll over the wing trailing spars instead of sliding over them. The 'panel' wing trailing spars 330U and 330L function in much the same manner as the fuselage membrane spars in the above presented 'full delta' and 'sweptback' variable area wings. Like the 'full delta' and 'sweptback' wings, these spars have design allowance made for digression from the aircraft's lateral plane for any anhedral or dihedral wing attitude or wing leading edge airfoil profile or wing configuration. Not delineated and therefore not shown save for the wing leading edge 62 or 82 in FIG. 12 are brief and whole airfoil form wing plates and supplementary wing stiffening forms, plates and spars.

Fuselage Spars

The presented 'panel' wing fuselage spars FIGS. 12A and B are as described above in Article 2 and shown in FIG. 2 for the 'full delta' and 'sweptback' fuselage spars except that allowance is made in the spacing between the same side fuselage spars to facilitate the insertion of a rolling or sliding (but preferably rolling) connection to the variable area 'panel' wing's leading edge spar 34U and wing major spar 34L. The wing major spar 34L and stationary after wing spars 330U and 330L, in the given example, can cross the fuselage's longitudinal centreline 12 at 'right' angles and lay symmetrically across the aircraft's fuselage 18. The forward leading edge wing spar 34U and wing major spar 34L are each connected at their centres to the fuselage spars 30 and 32 by a rolling or sliding wing lifting, load bearing connection common in the art (not shown) which is placed between or over the fuselage spars 30 and 32 in such a way as to prevent all motion other than an easy back and forth movement under Wing loaded conditions (FIG. 20).

Whole Wing Airfoil

The wing leading airfoil form 62 (or 82), as shown in FIG. 12A, is attached to the wing leading edge spar 34U by a continuous hinged joint, common in the art. Wing forward airfoil spar 34F is identical to and performs the same function and leading edge spar 34U is straight and projects from the fuselage's longitudinal centreline at a right angle and lays aft of the leading edge the wing airfoil form 62 or 82, FIG. 12A.

'Panel' Wing. Threading of Wing Membranes

As shown FIG. 12B the variable area 'panel' wing membrane 58 is thread around and through the wing leading edge spar 36U, wing major spar 36L and wing trailing spars 330U and 330L in much the same way as the 'full delta' and 'sweptback' variable area wing membranes of FIGS. 3A and 7 are threaded except that angles have changed and the wing membrane is not looped around the fuselage spars.

'Panel' Wing. Actuating Mechanism and Theory of Operation

Actuating Mechanism

The drawing in FIGS. 12A and 12B shows a threaded rod 302 running along the aircraft's centreline 12. Threaded rod 302 is connected to the fuselage 18 in such a way as to allow the rod 302 to freely rotate but not otherwise move. This rod 302 has right hand thread 304 along one half of its length and a left hand thread 306 along the remaining half.

Threaded onto said rod 302 is a right hand threaded 'nut' 310 and a left hand threaded 'nut' 308 which are brought into close proximity. Firmly but detachably fastened to said 'nuts' 308 and 310 are the travelling wing leading edge spars 34U and 36U, respectively, and wing major spars 34L and 36L, respectively. Wing leading edge spars 34U and 36U and wing major spars 34L and 36L project equally through the fuselage spars 30 and 32, respectively. Spars 34U, 36U, 34L and 36L are fastened in such a way as to be able to move back and forth easily (FIG. 20) yet still transmit wing lifting force to the fuselage spars 30 and 32.

Theory of Operation

As the threaded rod 302 is rotated clockwise or counter-clockwise by the driving device 312, the opposing motion imparted to the forward nut 308, the attached wing leading edge spars 34U and 36U, the after nut 310 and the attached wing major spars 34L and 36L, draw these elements away from each other. This causes the constantly taut wing membrane 58 to unfurl from the wing's interior and increase the wing area. This process is reversible.

13 'Trimming' Ballast: Variable Area 'Full Delta', 'Sweptback' and 'Panel' Wings, Actuating Mechanism and Theory of Operation FIG. 13

Within the fuselage and suitably located along the fuselage's centreline 12 is a length of threaded rod 320. Connected to this rod is a driving device 322 which rotates rod 320 in either clock-wise or counter clockwise rotation. Threaded onto this rod are a number of location adjustable 'nuts' 324, 326 and 328. Connected to nuts 324, 326 and 328 are the variable area wing equipped aircraft trimming ballast weight 240.

This weight may be an integral part of the aircraft's control system's devices or mechanisms which can be moved. These movable items can include battery packs, wireless control receivers, a person or persons, cargo or just plain old ordinary ballast. They should be fastened to the nuts in such a way as to allow only movement forward and back.

Theory of Operation

As the described 'full delta' 'sweptback' and 'panel' variable area wing spars furl or unfurl the aircraft's centre of gravity must move slightly. However the moving point of lift of the variable area wing will change the moment of the wing's point of lift in relation to the aircraft's centre of gravity.

In order to counter-balance this anticipated instability, the trimming ballast driving device compensates by physically moving the designated ballast weight to re-orient the aircraft's centre of gravity. The shown screw thread 320 could be linked by gears or roller chains to the variable area wing drive mechanism so that compensation of the wing lift moment is automatic. In the alternative, the driving device's speed of rotation and resulting rate of movement of the suitably distributed trimming ballast weight could be under the control of a micro processor device.

Micro processor control would be synchronized with the variable area wing's changing point of lift and changing wing airfoil cross section. Such automatic or processor control of rotation to the trimming device should produce the continuous effect of the wing maintaining a suitable angle of attack and the aircraft retaining a trimmed attitude.

FIG. 14 plan view of 'full delta' wing in open (FIG. 14A) and close (FIG. 14B) positions.

FIG. 15 plan view of 'sweptback' wing in open (FIG. 15A) and close (FIG. 15B) positions.

FIG. 16 plan view of 'panel' wing in open (FIG. 16A) and close (FIG. 16B) positions.

Articles corresponding to FIGS. 14, 15 and 16 are intended to illustrate other shapes of wing planiforms for use with the apparatus of the present invention.

It is again noted, from the above Summary of the Invention, that details of motive sources or drives for the actuation of the various mechanisms are omitted because such motive sources or drives are well known in the art. Manually produced or stored electric, pneumatic, hydraulic or other forms of motive power could be utilized to operate the various mechanisms in various ways.

For instance, as shown in FIG. 17 a manually operated push-pull 'long nut' actuating mechanism 400 may be substituted for the long nut screws 88L and 88R which operates the wing spar moving mechanism as described in the presented 'full delta' an 'sweptback' wing drive mechanisms of Article 8 and FIG. 8. And, as shown in FIG. 18, an alternate pull-pull tether line actuating mechanism 500 is substituted for the presented left and right hand threaded rod and nut mechanism as described in Article 12 and FIG. 12.

17 'Full Delta' and 'Sweptback' Variable Area Wings, Alternate Manual Wing Drive Mechanism 400 and Theory of Operation. FIG. 17

FIG. 17 shows a side elevation of the sliding upper 402U and lower 402L long nuts similar to the long nuts 102U and 102L described in Articles 2 and 8 and as shown in FIGS. 2 and 8, respectively. All connections are to be firmly but detachably made. A single roller chain is used as an example but multiple chains and same system back-up drives would seem to be safer albeit a little more complex.

Connected to the forward end of upper 'long nut' 402U is roller chain 404. Roller chain 404 is led forward and over to engage around a chain sprocket 406 situated on a shaft 408. Shaft 408 allows chain sprocket 406 to rotate freely but not otherwise move.

The shaft 408 of sprocket 406 is connected to the aircraft's fuselage members (not shown). Roller chain 404 is then led aft to be connected to the forward end of lower 'long nut' 402L.

Connected to the after end of upper long nut 402U, a roller chain 410 is led aft over chain sprocket 412. Chain sprocket 412 is connected to a rotating shaft 414. Rotating shaft 414 is connected to the fuselage members (18, again not shown). Roller chain 410 is led forward from under chain sprocket 412 to connect to the after part of 'long nut' 402L.

Commonly connected to shaft 408 is another roller chain sprocket 416. Engage around sprocket 416 is a roller chain 418. Roller chain 418 may extend below the fuselage to engage around sprocket 420. Sprocket 420 is connected to a shaft 422.

Shaft 422 is suitably supported by connection to the aircraft's fuselage in or away from the aircraft's fuselage. Commonly connected to shaft 422 is a worm gear 424. Engaging this worm gear is a worm 426. The worm gear 424 and worm teeth 428 should prevent the stresses on the variable area wing from 'free wheeling' the wing operating mechanism to a different position.

Through the centre hole of this worm 426 is firmly connected a rod 430. At the free end of rod 430 a hand crank 432 or equivalent device is positioned and firmly held in such a way as to be conveniently accessible to a person operating and presumably piloting a hang glider equipped with one of the presented 'full delta' or 'sweptback' variable area wings.

Theory of Operation

As the operator either winds, pulls down or pushes up the variable area wing actuating manually operate mechanism at 432, the worm 426 and engaged gear 424 cause the chain drive train to open and close the variable area 'full delta' and 'sweptback' wing's major wing leading edge spars. These leading edge spars are attached to the wing spar pivot hubs. The wing spar pivot hubs are adapted to engage the rack gear teeth and be driven thereby by the action of the long nuts that move the rack back and forth. Alternate manual wing drive mechanism 400 performs the same function and essentially duplicates the action of the drive mechanisms illustrated in FIGS. 2, 8A and 8B.

18 'Panel' Variable Area Wing, Alternate Tether Line Wing Actuating Mechanism and Theory of Operation. FIG. 18

WING ACTUATING MECHANISM. Shown in FIG. 18 is a sectional side elevation of the simple or kite 'panel' wing spar arrangement located in the interior of an aircraft fuselage. The fuselage members are not shown.

Double lines are depicted for control cables and tethers. Single lines are used to represent flexible membranes. These control cables may be made of a suitable longitudinally stable and flexible material which is electrically non-conductive. The variable area wing actuating (opening) tether, main cable 502, is connected at 504 to two cables 506 and 508. These cables then pass through an aperture 510 in the fuselage where both cables 506 and 508 are led into the space between the right and left membranes. The right and left membranes are shown as a single line 58.

Cable 506 is led up to an entraining or mechanically engaging upper spindle 514. Cable 508 is led up to entrain or mechanically engage upper spindle 516.

Spindles are typical in that they are all line entraining or line capturing and all have centre shafts which are firmly attached to the fuselage members (not shown). The spindles can freely rotate about the shafts but not otherwise move.

Spindles are of efficient size and are strategically located. Such fixed spindle and shaft assemblies will be simply referred to as spindles for the remainder of this description. Cable 506 is then led over spindle 514 toward and past the wing leading spar 36U to spindle 518, Line 506 is then led over and under spindle 518 to be led back and connected to the central forward part of the wing leading edge spar 36U.

The central after part of wing leading edge spar 36U has another cable 520 attached to it. Cable 520 is led aft and over lower spindle 534.

Cable 520 is then led down through fuselage aperture 522 where it is connected at 524 to the variable area wing actuating main cable 526 and wing major spar attached cable 528. cable 528 is led back toward the aircraft's fuselage to pass through the fuselage aperture 522. It is then led over lower sprindle 530 to the wing major spar 36L where it is firmly attached to the central forward part of said spar 36L.

Firmly attached to the central after part of wing major spar 36L is cable 508 which is led aft past the stationary wing trailing spars 32U and 32L to be brought under and back over spindle 532. cable 508 is then led forward and over spindle 516 to be led down through fuselage aperture 510 where it is connected at connection 504 to wing actuating (opening) main line 502 and line 526 thus completing the line actuating loop.

Theory of Operation

When main cable 526 has more tension than main cable 502 the cables 520 and 528 which are connectd at 524 to main cable 526 pull the wing leading edge spar 36U and wing major spart 36L together. This causes the variable area wing membrane 58 to furl to close position. When variable area wing actuating main cable 502 has more tension than main cable 526 the cables 506 and 508, which are connected at 504 to main cable 502, draw the leading edge wing spar 36U and wing major spar 36L away from each other. This causes the variable area wing membrane 58 to unfurl to an open position.

The variable area wing positions may be held by applying equal tension to the wing actuating main cables 502 and 526. Ample lengths of cables 506 and 508 and cables 520 and 528 should be provided to allow the smooth operation of this method of actuating the variable area 'panel wing's' externally presented wing surface.

19 'Full Delta', 'Sweptback' and 'Panel' Wings, Sliding Connection, Wing Airfoil Plates and Forms. FIGS. 19A and B Shown in FIG. 19A and B are two methods of connecting the wing leading edge airfoil forms and wing trailing airfoil plates.

FIG. 19A shows a doubled series of firmly mounted low profile large area strip mounted or washer head pins 602 inserted through the airfoil form 82. These pins 602 pass through low friction toughened slots 604 provided in the wing trailing airfoil plate 84U of whole wing airfoil 80 of FIG. 3C.

The wing leading edge form 82 may be a single sheet or, in the case of a solid airfoil form, have a cavity provided for the insertion of the trailing airfoil plate. The pins 602 pass through both the leading edge form 82 and the trailing plate 84U. They are terminated beneath the trailing plate with suitable low friction, large surface washers or continuous large area strips 606 firmly attached to said pin terminations and wing plate airfoil surface. For a solid wing airfoil form, space must be allowed for the wing major spar to travel within a provided wing leading edge form cavity or hollow.

Figure 19B:
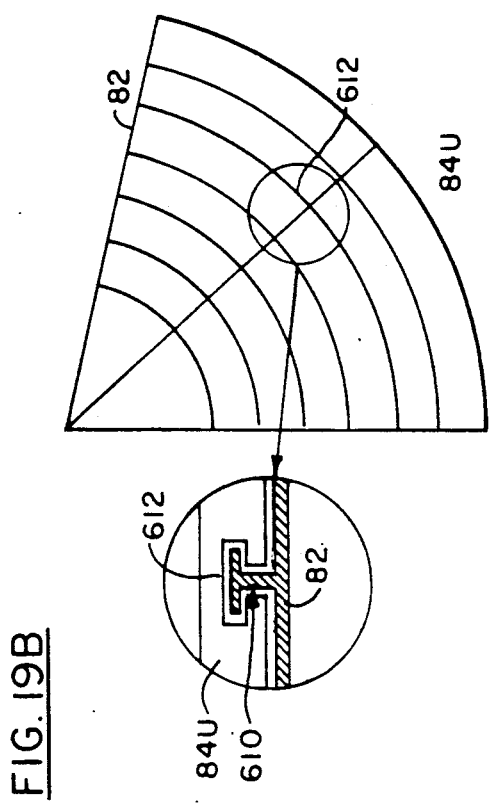

FIG. 19B shows 'T' shaped, curved fingers 610 which are situated in a supplementary cavity 612 provided by the wing leading edge airfoil form 82. These fingers 610 insert snugly into matching shaped, curved slots 612 provided in the wing trailing airfoil plate 84U.

The purpose of these low friction material constructed restraining slip joints, in either a straight pattern applicable to the presented 'panel' wing FIG. 19A or curved pattern applicable to the presented 'full delta' and 'sweptback' wings, is to hold the whole wing airfoil forms and plates together. By holding the airfoil forms and plates together, the wing lifting load does not allow the forms and plates to overcome the tension imposed by the wing membrane and buckle or deform the wing.

Of course the shown pin layout and pin slots could be curved and the shown shaped fingers and shaped finger slots could be straight. If of sufficient strength, the wing leading edge form and wing trailing edge plate slip joint could be used without a wing membrane.

Figure 20B:
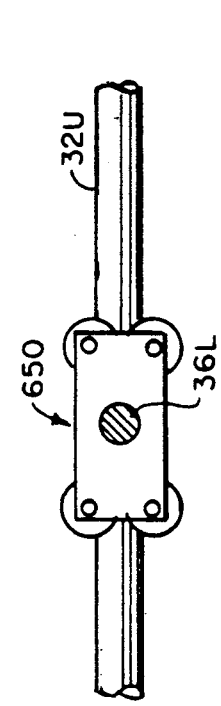
Figure 20C:
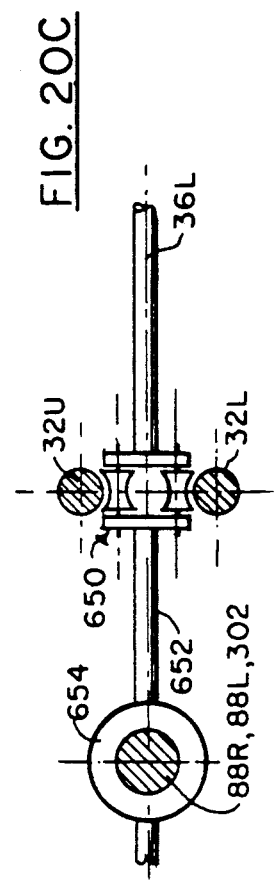

20 'Panel' Wing, Moving Connection, Fuselage Spars and Wing Spars. FIGS. 20A, B and C Shown in FIGS. 20A, 20B and 20C are two possible 'panel' wing fuselage spar configurations. FIGS. 20A and 20B show a single fuselage spar 32U and trolley 650. A travelling wing spar 36L is attached to one side of the trolley 650. At the other inner side of the trolley 650) a firm connection 652 is made to the nut 654 which is threaded onto the variable area 'panel' wing actuating mechanism threaded rod 88R, 88L of actuating apparatus 70 of FIGS. 8A and 8B or threaded rod 302 of FIGS. 12A and 12B.

FIG. 20C shows two 'panel' wing fuselage spars 32U and 32L with a trolley 650 nested between them. The wing spar and nut connections are as described for FIGS. 20A and 20B above.

Due to the wing lifting load being carried by the fuselage spars in the presented 'panel' wing, the fuselage spars should deform in response to such loading. Both types of trolley 650 should have, in anticipation of such loaded fuselage spar deformation, an initial adequately loose fit about said spars. Otherwise, when travelling, binding or interference between the upper and lower sets of rollers and the fuselage spars could result.

Mechanical Connections and Uses of Wing

It is noted that there are a great number of differing firm but detachable connections to be made to fasten, in fixed orientation, the described components to each other, and to the airframe or fuselage members. There are also a number of load bearing, rotating or sliding connections which require suitable restraints and low friction bearings. Examples are shown in FIGS. 19 and 20. These necessarily firm but detachable fastenings and bearing connections are believed to be within the skill of a person having ordinary skill in the art. For this reason, details of the connections have been omitted.

This wing is, by its nature, suitable for a light aircraft wing used for manned or un-manned powered flight, free flight, wireless controlled flight or tethered flight. Under favourable conditions, and if skillfully piloted, the inherent varying stall speed of the variable area wing could conceivably bring a powered or un-powered aircraft to a stable mid-air halt.

A recent (1988) magazine mini-article (Popular Science) showed a light aircraft with a deployed parachute firmly attached to the correctly oriented, floating, aircraft. Powered or un-powered aircraft constructed to the above presented wing designs carrying such attached emergency parachutes would indeed make a very safe manned aircraft.

It is noted that any wing can be constructed to suit a particular application or load carrying requirement using varied propulsive means and power sources. It will also be noted that construction of a heavier, load carrying version of the wing, using advanced available technologies, cannot reasonably be dismissed nor can the design of complexly threaded membrane wing. There would, however, seem to be a cross-over point where wing strength would be sacrificed for intricacy of wing construction.

It is also noted that single or multiple variable area wings or wing halves of any of the presented wing designs may be used as subsidiary lift producing wings. For instance, the wing designs of the present invention could be used as a variable area elevator tailplane. It could also be used as variable area directional, stabilizing or motive power producing rudders, keels, canards or boat sails.

The described 'panel' wing could be modified for use as a small marine craft mainsail while a variable area 'full delta' type wing half could be adpated for use as a jib sail. Such modification would result in a vertically oriented, cable operated, spring return form, variable area 'panel' wing travelling spars that could be made to slide to and fro along a mainsail boom with the stationary 'sail' membrane spars located at the mast.

The foregoing description of the preferred embodiment of the invention has been presented for the purposes of illustration and description. It is not intended be exhaustive or to limit the invention to the precise form or use disclosed. Many modifications and variations are possible in the light of the above teaching. It is intended that the scope of the invention be limited not by this detailed description, but rather by the claim appended hereto.

What is claimed is:

1. A variable area wing comprising
an aeronautical device comprising a fuselage having a lateral plane and a dorsal plane,
a movable leading edge spar disposed generally parallel to said lateral plane,
a first fuselage spar connected to said fuselage,
a second fuselage spar connected to said fuselage,
a movable major wing spar disposed between said leading edge spar and said first and second fuselage spars,
a flexible membrane adapted to be maintained in tension and serially wrapped about said spars beginning with said movable major wing spar, then said first fuselage spar, then said leading edge spar, then said second fuselage spar and back to said major wing spar, and
means for moving said leading edge spar and major wing spar toward and away from each other while maintaining said flexible membrane in tension about said leading edge, main wing, first fuselage and second fuselage spars.

2. The variable area wing as claimed in claim 1 wherein said means for moving said leading edge spar and major wing spar toward and away form each other while maintaining said flexible membrane in tension about said leading edge, main wing, first fuselage and second fuselage spars comprises
a set of rack members engaging separate pinion gear members, said pinion gear members respectively connected to said leading edge spar and said major wing spar,
means for moving said rack members in equal and opposite directions whereby said leading edge spar and said major wing spar are rotated in equal and opposite directions to furl and unfurl said membrane relative to said first and second fuselage spars.

3. The variable area wing as claimed in claim 1 wherein said means for moving said leading edge spar and major wing spar toward and away from each other while maintaining said flexible membrane in tension about said leading edge, main wing, first fuselage and second fuselage spars comprises
means for furling said membrane comprising
a main furling cable having an operator end and an actuating end,
a leading edge spar first cable having one end attached to one side of said leading edge spar and the other end attached to said actuating end of said main furling cable,
a major wing spar first cable having one end attached to one side of said major wing spar and the other end attached to said actuating end of said main furling cable,
means disposed between said ends of said leading edge spar first cable and said major wing spar first cable for guiding said first cables to cause said leading edge spar and said major wing spar to move toward each other when tension is applied to said operator end of said main furling cable,
means for unfurling said membrane comprising
a main unfurling cable having an operator end and an actuating end,
a leading edge spar second cable having one end attached to one side of said leading edge spar and the other end attached to said actuating end of said main unfurling cable,
a major wing spar second cable having one end attached to one side of said major wing spar and the other end attached to said actuating end of said main unfurling cable, and
means disposed between said ends of said leading edge spar second cable and said major wing spar second cable for guiding said second cables to cause said leading spar and said major wing spar to move away from each other when tension is applied to said operator end of said main unfurling cable.

4. A variable area wing comprising
an aeronautical device comprising a fuselage having a lateral plane and a dorsal plane,
a leading edge spar disposed generally parallel to said lateral plane,
a first trailing edge spar disposed generally parallel to said lateral plane,
a second trailing edge spar disposed generally parallel to said lateral plane,
a major wing spar disposed between said leading edge spar and said first and second trailing edge spars,
a flexible membrane adapted to be maintained in tension and serially wrapped about said spars beginning with said major wing spar, then said first trailing edge spar, then said leading edge spar, then said second trailing edge spar and back to said major wing spar, and
means for moving said leading edge spar, major wing spar, first trailing edge spar and second trailing edge spar toward and away from each other while maintaining said flexible membrane in tension about said leading edge, main wing, first trailing edge and second trailing edge spars.

5. The variable area wing as claimed in claim 4 wherein said means for moving said leading edge spar, major wing spar, first trailing edge spar and second trailing edge spar toward and away from each other while maintaining said flexible membrane in tension about said leading edge, main wing, first trailing edge and second trailing edge spars comprises
a set of rack members engaging separate pinion gear members, said pinion gear members respectively connected to said leading edge spar and said major wing spar,
means for moving said rack members in equal and opposite directions whereby said leading edge spar and said major wing spar are rotated in equal and opposite directions to furl and unfurl said membrane relative to said first and second fuselage spars.

6. The variable area wing as claimed in claim 4 wherein said means for moving said leading edge spar, major wing spar, first trailing edge spar and second trailing edge spar toward and away from each other while maintaining said flexible membrane in tension about said leading edge, main wing, first trailing edge and second trailing edge spars comprises
means for furling said membrane comprising
a main furling cable having an operator end and an actuating end, a leading edge spar first cable having one end attached to one side of said leading edge spar and the other end attached to said actuating end of said main furling cable, a major wing spar first cable having one end attached to one side of said major wing spar and the other end attached to said actuating end of said main furling cable, means disposed between said ends of said leading edge spar first cable and said major wing spar first cable for guiding said first cables to cuases said leading edge spar and said major wing spar to move toward each other when tension is applied to said operator end of said main furling cable, means for unfurling said membrane comprising a main unfurling cable having an operator end and an actuating end, a leading edge spar second cable having one end attached to one side of said leading edge spar and the other end attached to said actuating end of said main unfurling cable, a major wing spar second cable having one end attached to one side of said major wing spar and the other end attached to said actuating end of said main unfurling cable, and means disposed between said ends of said leading edge spar second cable and said major wing spar second cable for guiding said second cables to cause said leading edge spar and said major wing spar to move away from each other when tension is applied to said operator end of said main unfurling cable.

* * * * *